US008843923B2

(12) United States Patent
Iwamatsu et al.

(10) Patent No.: US 8,843,923 B2
(45) Date of Patent: Sep. 23, 2014

(54) INFORMATION PROCESSOR, CONTROL METHOD, AND COMPUTER-READABLE RECORDING MEDIUM RECORDING CONTROL PROGRAM

(75) Inventors: Noboru Iwamatsu, Kawasaki (JP); Naoki Nishiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/097,272

(22) Filed: Apr. 29, 2011

(65) Prior Publication Data

US 2012/0011506 A1 Jan. 12, 2012

(30) Foreign Application Priority Data

Jul. 7, 2010 (JP) ................................ 2010-154806

(51) Int. Cl.
 G06F 9/455 (2006.01)
 G06F 1/32 (2006.01)
(52) U.S. Cl.
 CPC ............. G06F 9/45541 (2013.01); *Y02B 60/32* (2013.01); *G06F 1/3287* (2013.01); *G06F 1/3215* (2013.01)
 USPC ............................................. 718/1; 713/300
(58) Field of Classification Search
 None
 See application file for complete search history.

(56) References Cited

U.S. PATENT DOCUMENTS

| | | | |
|---|---|---|---|
| 6,804,792 B2 | 10/2004 | Nishikawa | |
| 7,228,443 B2 | 6/2007 | Nishikawa | |
| 7,743,267 B2 | 6/2010 | Snyder et al. | |
| 8,255,708 B1* | 8/2012 | Zhang | 713/300 |
| 8,458,432 B2 | 6/2013 | Hashimoto et al. | |
| 2001/0014950 A1 | 8/2001 | Nishikawa | |
| 2002/0083110 A1* | 6/2002 | Kozuch et al. | 709/1 |
| 2005/0033999 A1 | 2/2005 | Nishikawa | |
| 2005/0108440 A1* | 5/2005 | Baumberger et al. | 710/1 |
| 2005/0198633 A1* | 9/2005 | Lantz et al. | 718/1 |
| 2006/0085794 A1 | 4/2006 | Yokoyama | |
| 2006/0107269 A1* | 5/2006 | Bantz et al. | 719/310 |
| 2006/0136934 A1* | 6/2006 | Nesher et al. | 719/324 |
| 2007/0245163 A1* | 10/2007 | Lu et al. | 713/300 |

(Continued)

FOREIGN PATENT DOCUMENTS

| | | |
|---|---|---|
| EP | 1134656 A1 | 9/2001 |
| JP | 7-225694 A | 8/1995 |

(Continued)

OTHER PUBLICATIONS

Office Action of Japanese Patent Application 2010-154806 dated Feb. 4, 2014, with English Translation, 5 pages.

*Primary Examiner* — Emerson Puente
*Assistant Examiner* — Mehran Kamran
(74) *Attorney, Agent, or Firm* — Fujitsu Patent Center

(57) ABSTRACT

A computer is provided with a measuring unit that measures elapsed time at a non-access state between one of the guest virtual machines and the devices as a non-access time with respect to each of the guest virtual machines accessing the devices via the device driver virtual machine; a storage unit that stores the operation profile information that matches the non-access time with the operation mode information representing the operation modes of the devices; a decision unit that decides the operation mode with reference to the operation profile information on the basis of the measured access time; and a transition control unit that transits the devices to the operation mode, so that this makes it possible to appropriately carry out power saving management of the devices not depending on a power saving function of the guest OS.

16 Claims, 12 Drawing Sheets

(56) References Cited

U.S. PATENT DOCUMENTS

| | | |
|---|---|---|
| 2008/0098194 A1 | 4/2008 | Hashimoto et al. |
| 2008/0104587 A1* | 5/2008 | Magenheimer et al. ........... 718/1 |
| 2008/0109663 A1* | 5/2008 | Snyder et al. ................. 713/300 |
| 2009/0150896 A1* | 6/2009 | Tsushima et al. ............. 718/104 |
| 2010/0218014 A1* | 8/2010 | Bozek et al. .................. 713/320 |
| 2010/0306560 A1* | 12/2010 | Bozek et al. .................. 713/320 |
| 2011/0321042 A1* | 12/2011 | Yang et al. ......................... 718/1 |
| 2012/0011505 A1* | 1/2012 | Fujisaki et al. .................... 718/1 |
| 2012/0054740 A1* | 3/2012 | Chakraborty et al. ............ 718/1 |
| 2012/0102192 A1* | 4/2012 | Takeshima et al. ........... 709/224 |

FOREIGN PATENT DOCUMENTS

| | | |
|---|---|---|
| JP | 2000-137550 A | 5/2000 |
| JP | 2000-305671 A | 11/2000 |
| JP | 2001-43098 A | 2/2001 |
| JP | 2001-222346 A | 8/2001 |
| JP | 2001-290568 A | 10/2001 |
| JP | 2003-256088 A | 9/2003 |
| JP | 2005-115653 | 4/2005 |
| JP | 2006-113767 | 4/2006 |
| JP | 2007-11494 A | 1/2007 |
| JP | 2008-102667 A | 5/2008 |
| JP | 2008-120085 A | 5/2008 |

* cited by examiner

FIG. 3

| DEVICE STATE | EXPLANATION |
|---|---|
| D0 (OPERATION STATE) | FULL OPERATION STATE |
| D1 (IDLE STATE) | DEVICE IS IN OPERATION, BUT IN A LOW SPEED BUS STATE. DEVICE CAN IMMEDIATELY RETURN TO D0 |
| D2 (STANDBY STATE) | DEVICE IS IN OPERATION, BUT IN A LOW SPEED BUS STATE AND SOME FUNCTIONS ON DEVICE ARE TURNED OFF. DEVICE CAN RETURN TO D0 AT RELATIVELY HIGH SPEED |
| D3 (OFF STATE) | BUS AND POWER SUPPLY TO DEVICES ARE STOPPED. IN ORDER TO RETURN TO D0, PROCESSING SUCH AS RESET OF DEVICE IS REQUIRED |

※ D1 TO D3 ARE POWER SAVING STATES

INACTIVITY VALUE: FROM 0 TO 180000
ADDED EACH 10MS BY TIMER INTERRUPT (PEAK IN 30 MINUTES)

| DEVICE | GUEST OS-A | | | GUEST OS-B | | |
|---|---|---|---|---|---|---|
| | D1 | D2 | D3 | D1 | D2 | D3 |
| 3G | 100 | 200 | 180000 | N/A | N/A | N/A |
| WIRELESS LAN | N/A | N/A | N/A | 100 | 200 | 60000 |
| CAMERA | 100 | 200 | 180000 | 100 | 200 | 1000 |
| SD MEMORY | 100 | 200 | 60000 | 100 | 200 | 60000 |

INFORMATION PROCESSOR, CONTROL METHOD, AND COMPUTER-READABLE RECORDING MEDIUM RECORDING CONTROL PROGRAM

CROSS-REFERENCE TO RELATED APPLICATIONS

This application is based upon and claims the benefit of priority of the prior Japanese Patent Application No. 2010-154806, filed on Jul. 7, 2010, the entire contents of which are incorporated herein by reference.

FIELD

The embodiments discussed herein are related to a technology that controls an information processor provided with various kinds of devices.

BACKGROUND

In recent years, logically dividing one physical computer into plural computers using a virtual technology, these computers respectively run a separate Operating Systems (OS), for example, a guest OS. These logical computers may be referred to as a virtual machine (VM).

In addition, according to the virtual technology, consolidating or integrating the OS running on plural servers into one server, it may be possible to realize power saving by efficient use of resources. Further, a migration technology for dynamically shifting the running virtual machine to other server has been also known. Depending on this technology, a power-saving operating method for cutting power of redundant servers by efficiently consolidating the virtual machines in accordance with workload has been also known.

On the other hand, the virtual technology originally for a large computer such as a server started to be applied to client's devices such as a notebook PC and a cellular phone because of downsizing and significant increase in performance of the computer. Due to application of the virtual technology to these client's devices, it is possible to expect improvement of a convenience obtained by using plural guest OSs with different user interfaces and achievement of security depending on abstraction of hardware and management the OS from a lower layer. Further, the notebook PC and the cellular phone are directly used by a user, so that power-saving operation used by a server for consolidating or migrating one device to other is hardly applied to these devices.

An information processor such as a notebook PC and a cellular phone to be mainly driven by a battery highly requires reduction of power consumption, and conventionally, a state of a power source of a device has been carefully managed by the OS and applications. For example, such an information processor realizes a function such as shifting the device into a lower power consumption mode, for example, clock-down and power supply stop. However, it is not possible to apply these methods of managing a power source state to a virtual machine system because there is a possibility that plural guest OSs are carried out at the same time and the same device is shared by other guest OS, so that this makes one guest OS impossible to freely stop the operation state.

Therefore, conventionally, a method of arranging a state transition command notified by a guest OS (for example, Advanced Configuration and Power Interface (ACPI) command) by means of a management OS and managing device resources shared by this management OS has been known, for example. Thereby, controlling shift to a real power saving mode of the device, it is possible to reduce power consumption in the virtual machine system in which plural guest OSs run.

[Patent Document 1] Japanese Patent Application Publication No. 2005-115653
[Patent Document 2] Japanese Patent Application Publication No. 2006-113767

However, as described above, according to the method of arranging a state transition command from each guest OS running in the virtual machine by means of the management OS, in order to appropriately realize power saving by the entire system, it is required that all guest OSs appropriately issue the state transition commands at anytime to positively carry out power saving. In other words, this involves a problem that, if only one guest OS does not issue the state transition command, shift to the power saving mode cannot be realized.

On operation of the system, a legacy OS unequipped with a function to command a state transition command may be run as a guest OS in order to maintain a compatibility. In such a case, for example, it is difficult to modify the legacy guest OS so as to be able to issue an appropriate state transition command. In addition, not only for the legacy guest OS but also for all guest OSs, it may be difficult to have equal power saving mechanisms due to a development resource problem.

On the other hand, under the condition that the guest OS does not run actively, the device maybe shifted to the power saving mode not depending on the transition command from the guest OS but in the judgment of the management OS and the virtual machine monitor. This may have a problem that it takes time since the device should be recovered from the power saving mode when the guest OS tries to use the device.

SUMMARY

According to an aspect of the invention, a computer including devices, the computer comprising: plural guest virtual machines that process the devices; a device driver virtual machine that carries out access processing to the devices on behalf of plural guest virtual machines; a measuring unit that measures elapsed time at a non-access state between one of the guest virtual machines and the devices as a non-access time with respect to each of the guest virtual machines accessing the devices via the device driver virtual machine; a storage unit that stores operation profile information that matches the non-access time with operation mode information representing operation mode of the devices; a decision unit that decides the operation mode with reference to the operation profile information on the basis of the non-measured access time; and a transition control unit that shifts the devices to the operation mode.

Further, according to another aspect of the invention, a control method executed by a computer provided with devices, the method comprising the steps of: realizing plural guest virtual machines that processes the devices; realizing a device driver virtual machine that performs access processing to the devices on behalf of the plural guest virtual machines; measuring elapsed time at a non-access state between one of the guest virtual machines and the devices as a non-access time with respect to each of the guest virtual machines accessing the devices via the device driver virtual machine; deciding the operation mode with reference to operation profile information that matches the non-access time with operation mode information representing operation modes of the devices on the basis of the non-access time measured in the measuring step; and shifting the devices to the decided operation mode.

Furthermore, according to another aspect of the invention, a computer-readable non-transitory medium recording a control program for allowing a computer including devices to perform a procedure, the procedure comprising: measuring elapsed time at a non-access state between one of the guest virtual machines and the devices as a non-access time with respect to each of the guest virtual machines accessing the devices via the device driver virtual machine that performs access processing to the devices on behalf of the plural guest virtual machines that process the devices; deciding an operation mode with reference to operation profile information that matches the non-access time with operation mode information representing operation modes of the devices on the basis of the measured non-access time; and shifting the devices to the decided operation mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating device states of the information processor as an example of the first embodiment;

DESCRIPTION OF EMBODIMENT(S)

Hereinafter, the embodiments of a present computer, a control method, and a computer-readable recording medium recording control program will be described with reference to the drawings.

(A) First Embodiment

Figure 1:
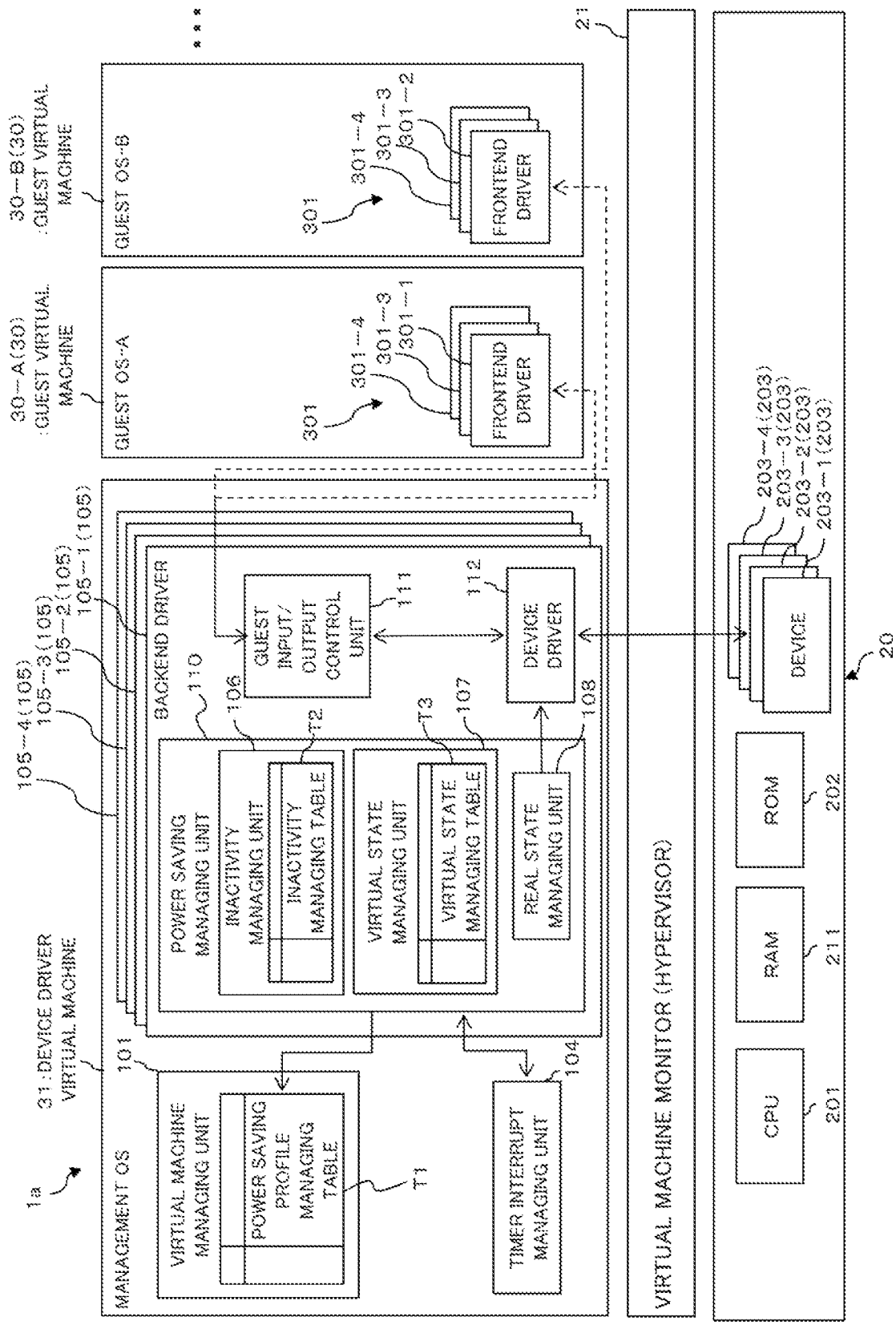
FIG. 1 is a pattern view illustrating a functional structure of an information processor as an example of a first embodiment.
Figure 2:
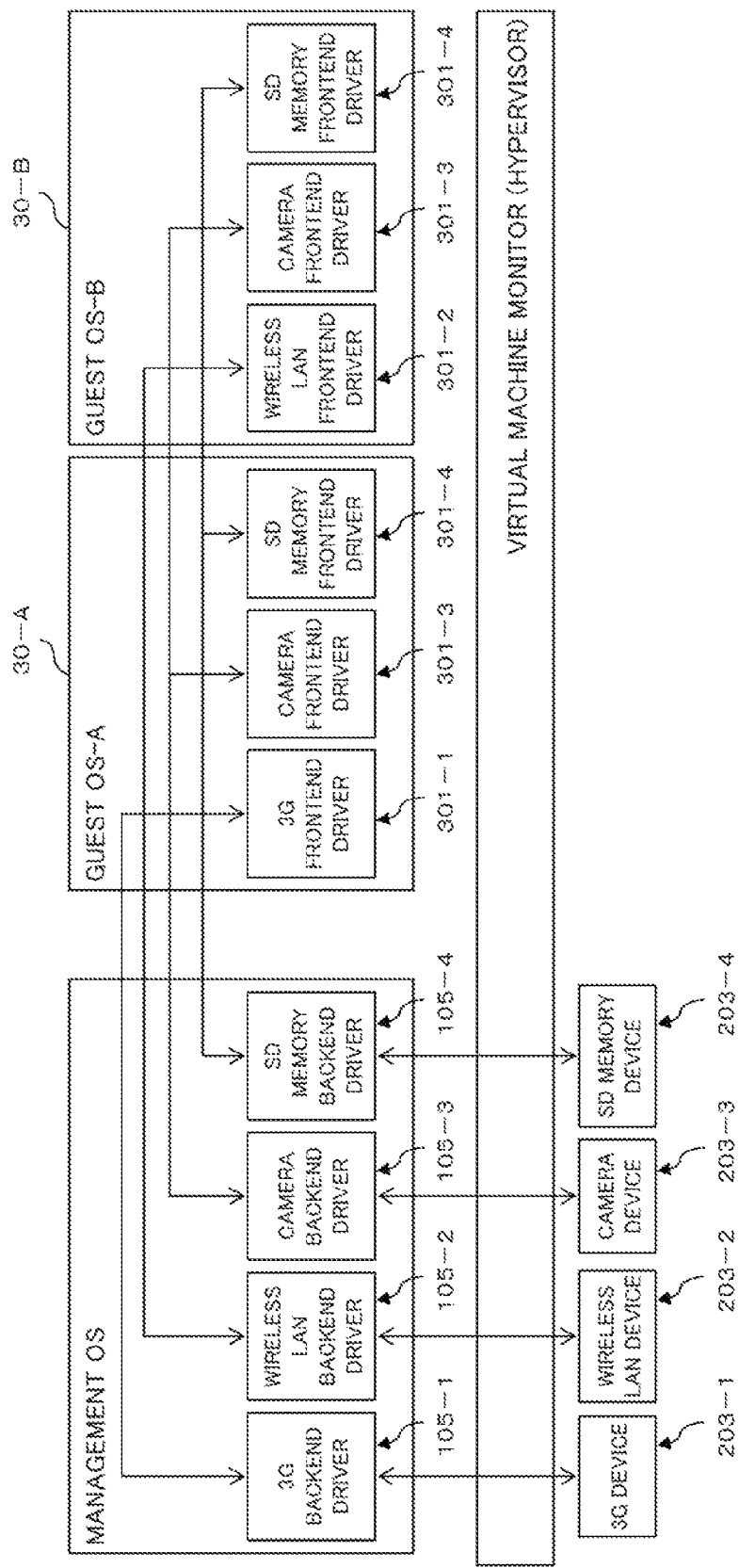
FIG. 2 is a view illustrating a structural example of devices and guest OSs of the information processor as an example of the first embodiment.

FIG. 1 is a pattern view illustrating a functional structure of an information processor (computer) 1a as an example of a first embodiment, and FIG. 2 is a view illustrating a structural example of devices and guest OS of the information processor 1a.

For example, the information processor 1a is an information processor such as a cellular phone, a Personal Digital Assistant (PDA), and a personal computer. According to the present embodiment, an example to use a cellular phone terminal as the information processor 1a will be described. Hereinafter, the information processor 1a may be simply referred to as a terminal.

As illustrated in FIG. 1, as a hardware resource 20, the present information processor 1a is provided with a CPU 201, a ROM 202, a RAM 211, and plural (in the present embodiment, four) devices 203-1 to 203-4.

The devices 203-1 to 203-4 are electronic components (modules) to realize various functions of the information processor 1a. The present embodiment includes a 3G device 203-1, a wireless LAN device 203-2, a camera device 203-3, and a SD memory device 203-4.

Here, for example, the 3G device 203-1 is a module for realizing communication in a communication system of a digital cellular phone based on "IMT-2000" standard defined by International Telecommunication Union (ITU) (so-called third generation cellular phone system).

The wireless LAN device 203-2 is a module for realizing communication through a wireless Local Area Network (LAN). In addition, the camera device 203-3 is a module for imaging of a camera, and the SD memory device 203-4 is a module for reading and writing the data from and into an SD memory card.

In other words, the present information processor 1a enables to perform the data communication in the 3G system or through the wireless LAN, and further, the present information processor 1a is configured as a cellar phone having a camera and a function to read and write the data from and into the SD memory card.

Hereinafter, as a remark representing the device, when it is required to specify one of the 3G device 203-1, the wireless LAN device 203-2, the camera device 203-3, and the SD memory device 203-4, remarks 203-1 to 203-4 are employed, however, when denoting arbitrary devices, a remark 203 is used.

The ROM 202 is a storage device for storing OS, programs, and various data to be run by the CPU 201.

The RAM 211 is a storage area for temporarily storing various data and programs, and when the CPU 201 executes the programs, the RAM 211 is used to temporarily store and expand the data and the programs. In addition, in this RAM 211, the data stored in a memory shared by virtual machines (not illustrated) and respective virtual memories (vRAM) by means of the device driver virtual machine 31 and the guest virtual machines 30 to be described later are stored.

The CPU 201 is a processor for carrying out various controls and calculations, and the CPU 201 realizes various functions by executing the OS and the program stored in the ROM 202.

In addition, the present information processor 1a realizes a virtual system including one or more guest virtual machines 30 (30-1, 30-2, . . . ) by running a virtual machine monitor (hypervisor) 21 on a hardware resource 20.

The virtual machine monitor 21 is software (a virtual OS), which enables to run plural and different OSs in parallel by virtualizing the information processor 1a and generating plural guest virtual machines 30-A, 30-B, and a device driver virtual machine 31. This virtual machine monitor 21 realizes its function when it is operated by the CPU 201 of the hardware resource 20.

This virtual machine monitor 21 creates plural virtual machines (VM) 30 that is a virtual computer behaving like hardware of a computer and the device driver virtual machine 31 by means of software. Then, the virtual machine monitor 21 is capable of running various kinds of OSs (the guest OS, the management OS) on these guest virtual machines 30 and the device driver virtual machine 31.

In other words, the virtual machine monitor 21 enables to use the hardware resource 20 that is a computer resource as a plural computer resources like hardware.

As this virtual machine monitor 21, for example, VMware, Xen, Oracle VM, Hyper-V, KVM, and LPAR can be employed.

Hereinafter, according to the present embodiment, an example that the device driver virtual machine 31 and plural (in the example illustrated in FIG. 1, two) guest virtual machines 30-A, 30-B are operated on the virtual machine monitor 21 will be described.

The guest virtual machines 30-A, 30-B are computers, which are virtually provided and are independent of each other, and the guest virtual machines 30-A carry out various processing by running the guest OS respectively. Hereinafter, the OS to be run on the guest virtual machine 30-A may be referred to as the guest OS-A and the OS to be run on the guest virtual machine 30-B may be referred to as the guest OS-B.

Hereinafter, as a remark representing the guest virtual machines 30, when it is required to specify one of the plural guest virtual machines, remarks 30-A, 30-B are employed, however, when denoting arbitrary devices, a remark 30 is used.

According to the present embodiment, the information processor 1a executes two guest OSs, namely, a guest OS-A and a guest OS-B; and as necessary, accessing any one of the 3G device 203-1, the wireless LAN device 203-2, the camera device 203-3, and the SD memory device 203-4, the information processor 1a carries out the processing.

Then, according to the example of the present embodiment illustrated in FIG. 2, in the information processor 1a, the guest OS-A has a telephone call function or a communication function applying the 3G, the camera, and the SD memory and using a 3G communication network. In addition, the guest OS-B has an in-plant IP telephony function applying the wireless LAN, the camera, and the SD memory and using a wireless LAN network.

The guest OS-A and OS-B are provided with one or more Frontend drivers 301, respectively.

The Frontend drivers 301-1 to 301-4 are device drivers, respectively, and they control access from the guest virtual machines 30 to respective devices 203. These Frontend drivers 301-1 to 301-4 access respective devices 203 via Backend drivers 105-1 to 105-4 that are provided in the management OS of the device driver virtual machine 31 to be described later.

According to the example illustrated in FIG. 2, the guest OS-A of the guest virtual machines 30-A is provided with the Frontend drivers 301-1, 301-3, and 301-4. In addition, the guest OS-B of the guest virtual machine 30-B is provided with the Frontend drivers 301-2, 301-3, and 301-4.

Specifically, the Frontend driver 301-1 accesses the 3G device 203-1 via the Backend driver 105-1 and the Frontend driver 301-2 accesses the wireless LAN device 203-2 via the Backend driver 105-2. In the same manner, the Frontend driver 301-3 accesses the camera device 203-3 via the Backend driver 105-3 and the Frontend driver 301-4 accesses the SD memory device 203-4 via the Backend driver 105-4.

Further, in the drawings, respective remarks having numbers after - (hyphen) such as -1, -2, -3, and -4 represent that respective remarks having the same numbers correspond to each other. For example, according to the example illustrated in FIG. 2, the Frontend driver 301-1 and the Backend driver 105-1 correspond to the 3G device 203-1. In the same way, the Frontend driver 301-2 and the Backend driver 105-2 correspond to the wireless LAN device 203-2, and the Frontend driver 301-3 and the Backend driver 105-3 correspond to the camera device 203-3, respectively. Further, the Frontend driver 301-4 and the Backend driver 105-4 correspond to the SD memory device 203-4. In the same way, remarks having then numbers of -1 to -4 represent that the parts denoted by these remarks correspond to each other.

Hereinafter, as a remark representing the Frontend driver, when it is required to specify one of the plural Frontend drivers, remarks 301-1 to 301-4 are employed, however, when denoting arbitrary Frontend driver, a remark 301 is used. In the same way, as a remark representing the Backend driver, when it is required to specify one of the plural Backend drivers, remarks 105-1 to 105-4 are employed, however, when denoting arbitrary Backend driver, a remark 105 is used.

The device driver virtual machine 31 carries out access processing to respective devices 203 on behalf of the guest virtual machines 30-A and 30-B.

According to the virtual machine system of the present embodiment, with respect to input and output of the guest virtual machines 30 running the guest OS into and from the real devices 203, there is provided the device driver virtual machine 31 that is a virtual machine for accessing the real devices other than the guest virtual machines 30.

The guest virtual machines 30 are capable of accessing the real devices 203 via this device driver virtual machine 31.

Here, the device driver virtual machine 31 can be a virtual machines that is independent for each device 203; can be a virtual machine consolidating input and output into and from the plural devices 203; and further, can be adapted to incorporate its function of the device driver virtual machine 31 in the virtual machine of other usage such as a virtual machine for management.

In any structure, the device driver virtual machine 31 includes a device driver 112 for driving the real devices 203 within itself, and plays a role in mediating output from the guest virtual machines 30 into the devices 203 and input from the devices 203 into the guest virtual machines 30.

As illustrated in FIG. 1, the device driver virtual machine 31 is provided with a virtual machine managing unit (an operation profile information managing unit) 101, a timer interrupt managing unit 104, and Backend drivers 105.

The timer interrupt managing unit 104 generates interrupt signals (clock signals and reference timer clocks) at regular intervals and inputs these interrupt signals into the Backend driver 105. In the present information processor 1a, change of allocation of the CPU 201 and count of time or the like are carried out when the interrupt signals are inputted from this timer interrupt managing unit 104.

The Backend drivers 105 serve as a device driver for controlling the devices 203 and in response to an access request from the Frontend drivers 301, the Backend drivers 105 control access to the corresponding device 203.

Each of the Backend drivers 105 is provided for each device 203. As illustrated in FIG. 2, there are provided four Backend drivers 105 including the 3G Backend driver 105-1, the wireless LAN Backend driver 105-2, the camera Backend driver 105-3, and the SD memory Backend driver 105-4.

Here, the 3G Backend driver 105-1 controls access to the 3G device 203-1 in response to a request from the Frontend driver 301-1. In the same way, the wireless LAN Backend driver 105-2 controls access to the wireless LAN device 203-2 in response to a request from the Frontend driver 301-2. In addition, the camera Backend driver 105-3 controls access to the camera device 203-3 in response to a request from the Frontend driver 301-3. Further, the SD memory Backend driver 105-4 controls access to the SD memory device 203-4 in response to a request from the Frontend driver 301-4.

In other words, in the information processor 1a, for each device 203, there is a pair of the Frontend drivers 301 and the Backend drivers 105.

Further, the Backend drivers 105 communicate with the Frontend drivers 301 by means of a shared memory between the virtual machines and an event transmission channel between the virtual machines (not illustrated) or the like. A method for communication with the Frontend drivers 301 by means of the shared memory between the virtual machines and the event transmission channel between the virtual machines or the like can be realized by using various known methods. Here, the explanation thereof is omitted.

As illustrated in FIG. 1, respective Backend drivers 105 are provided with a power saving managing unit 110, a guest input/output control unit 111, and a device driver 112.

The guest input/output control unit 111 carries out the mediating processing for mediating input/output requests from the Frontend drivers 301 of the guest OS to the devices 203. In addition, the guest input/output control unit 111 sends a device access notice to notify the power saving managing unit 110 (to be described later) that the guest OS has accessed to the devices 203.

The device driver 112 serves as a driver for controlling and operating the devices 203 in practice. Further, this device driver 112 has not only a function for input and output into and from the devices 203 but also a function to issue a power state transition command to the devices 203 to shift the devices 203 to power saving operation modes at various stages (a device state and an operation mode).

FIG. 3 is a view illustrating device states of the information processor as an example of the first embodiment. According to this example illustrated in FIG. 3, the device states (the operation modes) at four stages, namely, D0 to D3 are illustrated.

Here, the device state D0 (the operation state) illustrates that the corresponding device 203 is in full operation state and is not in a power saving operation state. The device state D1 illustrates the state that the corresponding device 203 is in operation at a bus clock that is a lower speed than the full operation state. Further, the device is capable of immediately returning (shifting) to the device state D0 from this device state D1.

The device state D2 (the standby state) means that the corresponding device 203 is in operation at a bus clock that is a lower speed than the device state D0 and further, some functions of the device 203 are turned off. Further, the device is capable of returning to the device state D0 from this device state D2 at a relatively fast speed but slower than that when it returns from the device state D1.

The device state D3 (the off state) means that the bus clock and power supply to the device are stopped in the devices 203, and in order to return to the device state D0, the processing such as reset of the device is required.

Then, among these device states D0 to D3, the device states D1 to D3 are power saving states, and hereinafter, these device states D1 to D3 may be particularly referred to as power saving states. Power consumption amounts at respective device states are ranked as follows:

$$D0 > D1 > D2 > D3$$

Accordingly, levels of power saving at respective device states are as ranked follows:

$$D0 < D1 < D2 < D3$$

In other words, in the power saving states D1 to D3, a power saving effect becomes more effective as the state moves from D1 to D2 and D3, however, it takes longer time to return to the device state D0.

Then, the device driver 112 shifts the device 203 to the operation mode at any state among the above-described device states D0 to D3.

In addition, in the Backend drivers 105, input and output into and from the device 203 are realized by means of the above-described guest input/output control unit 111 and the device driver 112.

Figure 4A:
FIGS. 4A, 4B, and 4C are views for explaining a power saving profile managing table as an example of the first embodiment.

The virtual machine managing unit (an operation profile information managing unit) 101 serves to manage information being the basis when shifting respective devices 203 to respective power saving states, and the virtual machine managing unit 101 manages a power saving profile (Profile) managing table T1 as illustrated in FIG. 4A.

Figure 4C:
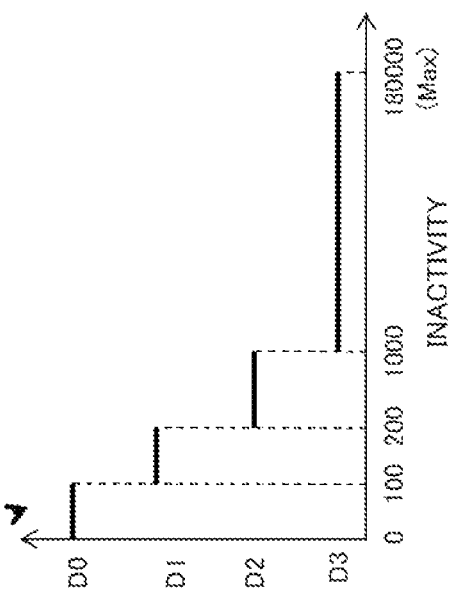
Figure 4B:
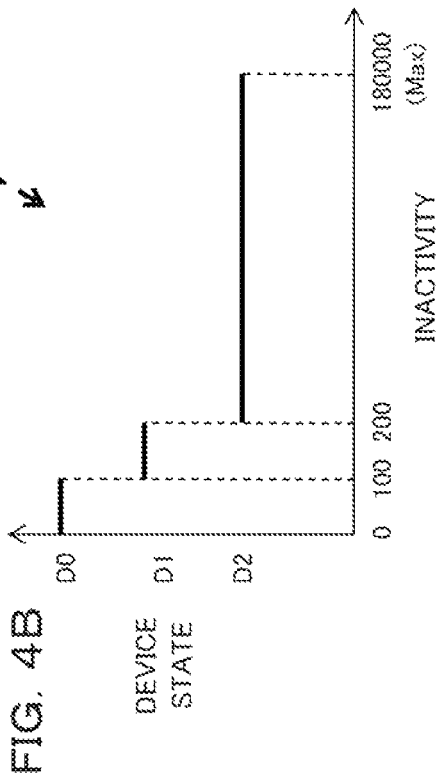

FIGS. 4A, 4B, and 4C are views for explaining the power saving profile managing table T1 as an example of the first embodiment. Here, FIG. 4A illustrates the power saving profile managing table T1, and FIG. 4B illustrates a relation between respective power saving states and inactivity values of the camera device 203-3 corresponding to the guest OS-A. Further, FIG. 4C illustrates a relation between respective power saving states and inactivity values of the camera device 203-3 corresponding to the guest OS-B.

As illustrated in FIG. 4A, the power saving profile managing table T1 manages a correspondence relation between respective power saving states and inactivity values of respective devices 203 for each guest OS.

Here, the inactivity value means an elapsed time that the guest OS (the guest virtual machines 30) has not been accessing to the devices 203, and further means an inactivity level of the guest OS (the guest virtual machines 30) for the corresponding device 203.

This inactivity value can be obtained in such a manner that an inactivity managing unit 106 to be described later estimates (counts) a period that there are no input and output between the guest OS and the devices 203 due to timer interrupt by means of the timer interrupt managing unit 104 from the guest input/output control unit 111.

In addition, the inactivity value is rest to 0 when there are input and output between the guest OS and the devices 203. Further, input and output between the guest OS and the devices 203 are notified by the guest input/output control unit 111.

In other words, this inactivity value represents an elapsed time at a non-access state (a non-access time) between the guest virtual machines 30 (the guest OS) and the devices 203. Further, upper limits are given to the inactivity values in advance, and the inactivity values do not excess these upper limits.

In the example illustrated in FIGS. 4A to 4C, the inactivity values as reference values (upper limits) for shifting respective guest OS-A and OS-B to the power saving states D1 to D3 correspond to each of the 3G device 203-1, the wireless LAN device 203-2, the camera device 203-3, and the SD memory device 203-4.

As illustrated in FIG. 4B, for example, the camera device 203-3 has the device state D0 in the inactivity value's range from 0 to 100 with respect to the guest OS-A, and has the power saving state D1 in the inactivity value's range from 100 to 200. Further, the inactivity value's range from 200 to 180000 is the power saving state D2. In addition, according to the present embodiment, it is defined that the upper limit of the inactivity value is 180000.

Addition of the inactivity value is carried out in the timer interrupt processing that is called at regular intervals in the virtual machine monitor and the management OS. This counting of the inactivity value is carried out in such a manner that one is incremented at regular intervals starting from 0. For example, assuming that the processing is woken once every 10 ms, in the case that there are no input and output between the guest OS and the device 203, the inactivity value accumulates 100 for a second. In this case, 180000 that is the highest value (the upper limit) of the inactivity value corresponds to thirty minutes.

Then, a virtual state managing unit 107 to be described later serves to set (change) a provisional power saving state with reference to this power saving profile managing table T1.

In other words, in this power saving profile managing table T1, it is represented that respective provisional power saving states are changed in the case that respective values (the inactivity values) registered relative to respective power saving states are exceeded.

According to the examples illustrated in FIGS. 4A to 4C, in the camera device 203-3 of the guest OS-A, when the inactivity value is not more than 100, the device state is equivalent to the device state D0. In addition, when the inactivity value is more than 100 and less than or equal to 200, the device state is equivalent to the power saving state D1, and when the inactivity value is more than 200, the device state is equivalent to the power saving state D2.

Further, the inactivity value never exceeds the highest value 180000, so that the power saving profile managing table T1 represents that the camera device 203-3 is not equivalent to the power saving state D3 with respect to the quest OS-A. On the other hand, with respect to the guest OS-B, when the inactivity value is not more than 100, the device state is equivalent to the device state D0, when the inactivity value is more than 100 and less than or equal to 200, the device state is equivalent to the power saving state D1, and when the inactivity value is more than 200, the device state is equivalent to the power saving state D2. Further, with respect to the guest OS-B, when the inactivity value is more than 1000, the device state is equivalent to the power saving state D3.

In other words, as described above, the power saving profile managing table T1 is a profile listing the inactivity values for respective devices 203 of the guest OS and the power saving states allowing shifting, and in this power saving profile managing table T1, the inactivity values being the basis of the state shifting are registered.

In other words, the power saving profile managing table T1 is a table that describes to what power saving state respective guest virtual machines 30 can shift the devices 203 in the case that respective guest virtual machines 30 have not used the devices 203 more than regular time.

Then, the virtual machine managing unit 101 behaves as an operation profile information managing unit that manages the power saving profile managing table T1 (the operation profile information) relating the inactivity values (the non-access times) with the power saving states of the devices 203 (the operation mode information).

In addition, for example, the power saving profile managing table T1 is stored in a storage device (a storage unit) such as a shared memory between the virtual machines. Further, the place where this power saving profile managing table T1 is stored may be appropriately changed.

The power saving managing unit 110 manages the power saving operation mode of the device 203, and as illustrated in FIG. 1, the power saving managing unit 110 is provided with the Inactivity managing unit 106, the virtual state managing unit 107, and a Real State managing unit 108.

The Inactivity managing unit 106 obtains the inactivity value from the guest input/output control unit 111 by counting a period that there are no input and output between the guest OS and the devices 203 due to timer interrupt from a timer (not illustrated). In other words, the Inactivity managing unit 106 behaves as a measuring unit for measuring the inactivity values (the non-access times).

In other words, the device driver virtual machine 31 measures or calculates how much the devices are used by respective guest virtual machines and how long time has been passed since the previous usage of the devices from input and output between the real devices 203 and the guest virtual machines 30.

Further, as described above, the upper limits are given to the inactivity values in advance, and the inactivity values do not excess these upper limits.

In addition, the Inactivity managing unit 106 manages the obtained inactivity values by means of an Inactivity managing table T2.

Figure 5:
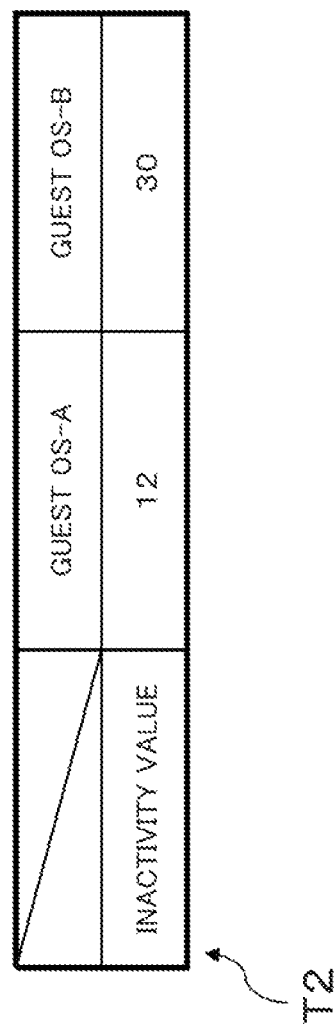
FIG. 5 is a view illustrating an example of an inactivity managing table as an example of the first embodiment.

FIG. 5 is a view illustrating an example of the inactivity managing table 2 as an example of the first embodiment. The inactivity managing table T2 is configured by storing the inactivity values relating to each guest OS with respect to the device 203 corresponding to the Backend driver 105.

The Inactivity managing unit 106 manages the elapsed time that the guest OS has not been accessing the device 203 as the inactivity value that is the inactivity level for the corresponding device 203 of the guest OS.

In addition, the Inactivity managing table T2 is stored in the shared memory between the virtual machines, for example. Further, the place where this Inactivity managing table T2 is stored may be appropriately changed.

The Virtual State managing (deciding) unit 107 manages the power saving states that the devices 203 are capable of shifting as provisional device states (operation modes) for each guest OS with reference to the power saving profile managing table T1 on the basis of the inactivity values for the devices 203 of the guest OS.

Figure 6:
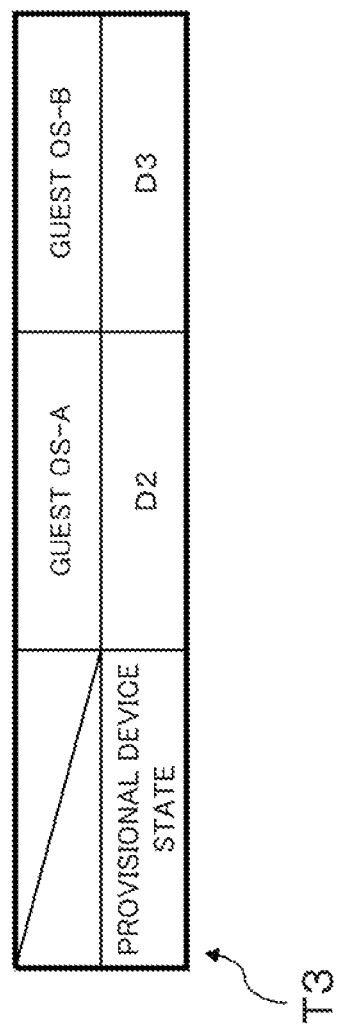
FIG. 6 is a view illustrating an example of a virtual state managing table as an example of the first embodiment.

This virtual state managing unit 107 manages a Virtual State managing table T3 as illustrated in FIG. 6.

FIG. 6 is a view illustrating an example of the virtual state managing table T3 as an example of the first embodiment. The virtual state managing table T3 is configured by storing the power saving states that can be shifted relating to each guest OS with respect to the device 203 corresponding to the Backend driver 105.

The Virtual State managing unit 107 selects the power saving state corresponding to the inactivity value with respect to the corresponding device 203 with reference to the power saving profile managing table T1 on the basis of the inactivity value that is calculated by the Inactivity managing unit 106. Then, the Virtual State managing unit 107 stores this selected power saving state as a provisional device state in the virtual state managing table T3.

In other words, the Virtual State managing unit 107 decides a provisional device state with respect to each of the plural management OSs (the guest virtual machines 30) sharing the devices 203.

In addition, this virtual state managing table T3 is stored on the shared memory between the virtual machines, for example. Further, the place where the virtual state managing table T3 is stored may be appropriately changed.

A real state managing unit (a deciding unit, a transition control unit) 108 selects one power saving state from among respective provisional power saving states corresponding to the plural guest OSs relating to the devices 203 that are registered in the virtual state managing table T3, and then, shifts the power saving state of the corresponding device 203 via the device driver 112.

This Real State managing unit 108 decides the provisional device state (the provisional operation mode) with the lowest level of power saving as a device state (the device selection mode) of a real device 203 from among respective provisional device states relating to the plural guest OSs with respect to the devices 203.

In other words, the above-described Virtual State managing unit 107 and this Real State managing unit 108 behaves as a deciding unit for deciding an operation mode with reference to the power saving profile managing table T1 on the basis of the inactivity value that is measured by the Inactivity managing unit 106.

The device driver virtual machine 31 is capable of calculating to what power saving state respective guest virtual machines 30 can shift the present device 203 with reference to the power saving profile managing table T1. Then, comparing the power saving states of respective guest virtual machines 30, the power saving state capable of being shifted by the all guest virtual machines 30 is selected to change the power saving states of the devices 203.

According to the examples illustrated in FIGS. 4A to 4C, for example, with respect to the camera device 203-3, the case that the respective inactivity values of the guest OS-A and OS-B are not less than 1000 (namely, there are no input and output for more than 10 seconds) will be considered. In this case, comparing the provisional power saving state D2 of the guest OS-A with the provisional power saving state D3 of the guest OS-B with reference to the virtual state managing table T3, the Real State managing unit 108 selects the power saving state D2 with the low power saving level as the power saving state of the camera device 203-3.

In addition, the Real State managing unit 108 shifts the corresponding device 203 to the selected power saving state. In other words, the Real State managing unit 108 also behaves as a transition control unit that shifts the device 203 to the decided operation mode.

The power management processing by means of the information processor 1a as an example of the first embodiment that is configured as described above will be described in accordance with the flowchart (steps A10 to A120) illustrated in FIG. 7. Then, in the present example, an example to carry out the power saving management of the camera device 203-3 among the plural devices 203 will be described.

Further, it is assumed that the guest virtual machines 30 and the device driver virtual machine 31 have been run by the virtual machine monitor 21 (the guest virtual machine realizing step, the device driver virtual machine realizing step).

When the interrupt signals are inputted due to control of the timer interrupt managing unit 104, the power saving managing unit 110 obtains a list of the guest OS currently connected to the Backend driver 105-3 (step A10). The list of the guest OS currently connected to the Backend driver 105-3 can be obtained by the guest input/output control unit 111, for example.

At first, in the obtained list of the guest OS, the first guest OS is selected (step A20). The power saving managing unit 110 starts to update the tables (the inactivity managing table T2 and the virtual state managing table T3) with respect to this selected guest OS (step A30).

The Inactivity managing unit 106 checks whether or not input and output are made between the guest OS and the device 203-5 from the previous table update to this table update (step A40). In the case that no input and output are made between the guest OS and the device 203-5 (refer to a NO route of step A40), next, the Inactivity managing unit 106 checks whether or not the inactivity value for the corresponding guest OS in the Inactivity managing table T2 becomes the upper limit (180000) (step A50). In the case that the inactivity value does not reach the upper limit (refer to No route of step A50), the Inactivity managing unit 106 increments the inactivity value by +1 (step A60).

Next, the Virtual State managing unit 107 obtains the power saving state corresponding to the current inactivity value with reference to the power saving profile managing table T1 on the basis of the inactivity value that is obtained in the step A60. The Virtual State managing unit 107 registers this obtained power saving state as a provisional device state in the virtual state managing table 13 relating to the target guest OS. Thereby, the virtual state managing table T3 is updated (step A70).

On the other hand, in the case that input and output are made between the guest OS and the device 203-5 from the previous table update to this table update (refer to YES route of step A40), the Inactivity managing unit 106 changes the inactivity value into 0 (step A100) and shifts to step A70.

In addition, in the case that the inactivity values reach the upper limits (refer to YES route of step A50), the processing also shifts to step A70.

The power saving managing unit 110 checks whether or not the table is completely updated with respect to the target guest OS (step A80), in the case that update of the table is not completed, the processing returns to step A30.

Figure 7:
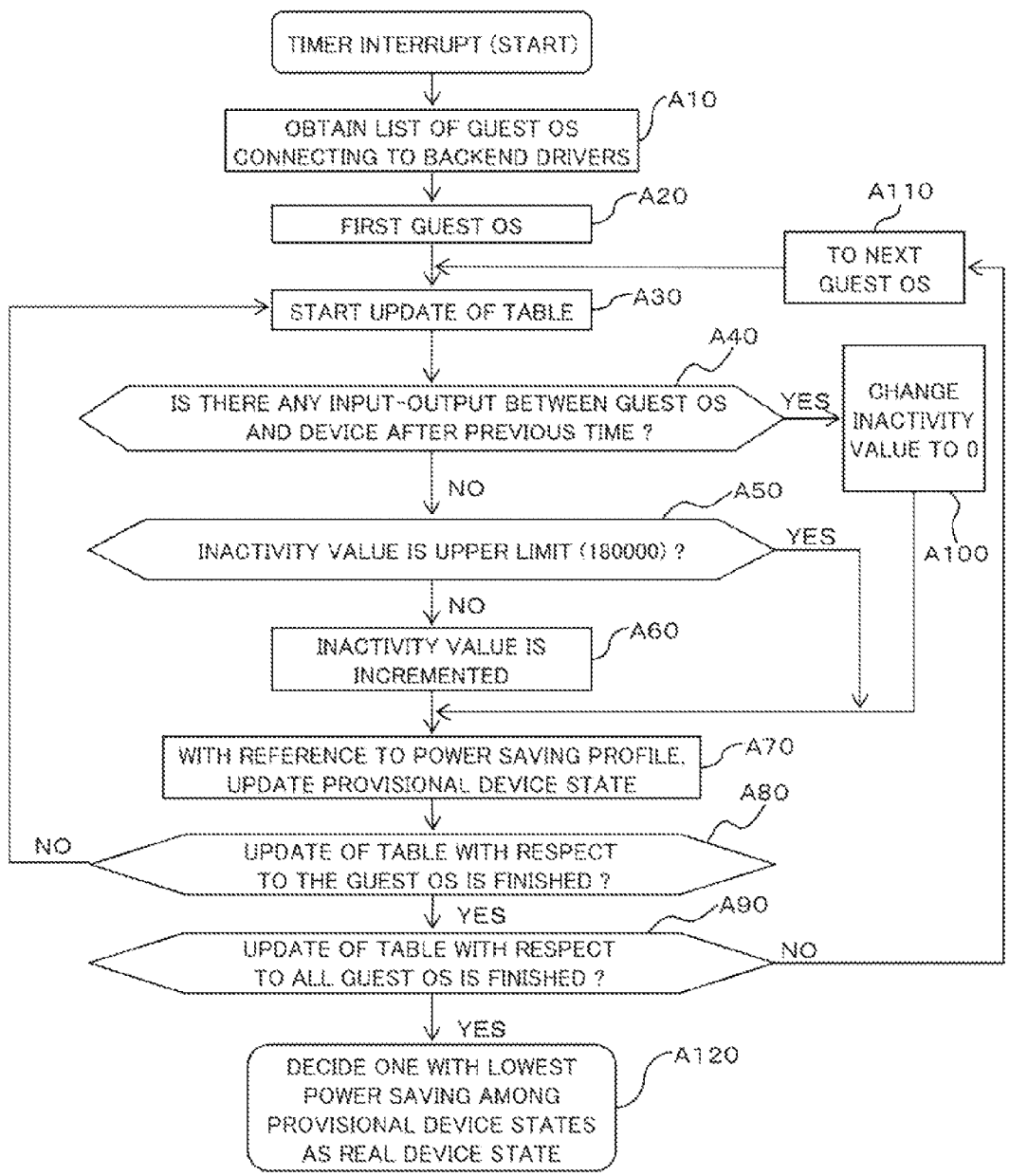
FIG. 7 is a flowchart for explaining power management processing in the information processor as an example of the first embodiment.

According to the example illustrated in FIG. 7, in these steps A30 to A80, the inactivity values are obtained. In other words, steps A30 to A80 are equivalent to a measuring step for measuring the elapsed time at the non-access state between the guest virtual machines 30 and the devices 203 as the non-access time.

In the case that the update of the table is completed with respect to the target guest OS (refer to YES route of step A80), next, the power saving managing unit 110 checks whether or not the update of the table is completed with respect to the all guest OSs in the list obtained in step S10 (step A90).

Here, in the case that update of the table is not completed with respect to the all guest OSs (refer to NO route of step A90), the power saving managing unit 110 returns to step A30 after changing a next guest OS in the guest OS list as a new target guest OS (step A110).

In the case that update of the table is not completed with respect to the all guest OSs (refer to YES route of step A90), the Real State managing unit 108 decides the provisional device state with the lowest level of power saving as a real device state from among the provisional device states relating to respective guest OS that are registered in the virtual state managing table T3 (step A120: deciding step).

In the case that the real device state is decided in this way, the Real State managing unit 108 sets the real device state that is decided with respect to the device 203-4 via the device driver 112 (shifting step).

Thus, according to the information processor 1a as an example of the first embodiment, not depending on the power saving function of the quest OS, the device driver virtual machine 31 is capable of appropriately carrying out power saving management of the devices according to the power saving profile managing table T1 that is set in advance in accordance with the guest virtual machines 30.

In addition, even when plural guest virtual machines 30 share and use the same device 203, it is possible to mediate the power saving states within a range meeting response speeds of the devices 203 required by the all guest virtual machines 30. In other words, even when the plural guest virtual machines 30 share and use the same device 203, it is possible to shift the operation modes of the devices 203 with access demands of the all guest virtual machines 30 for the devices 203.

Further, in development of the guest OS, it is also not necessary to mount a power saving mechanism for each hardware terminal (the information processor 1a) and the device driver virtual machine 31 (the virtual system) is capable of independently carrying out the power saving control in an equivalent manner. Thereby, it becomes possible to provide the same guest OS to plural and different hardware terminals and it becomes also possible to reduce a development cost. In addition, mounting of the power saving control is completed mainly within a management OS (a device driver domain) and it is also easy to port the power saving control into other hardware terminal in increments of module of the device driver domain.

(B) Second Embodiment

Figure 8:
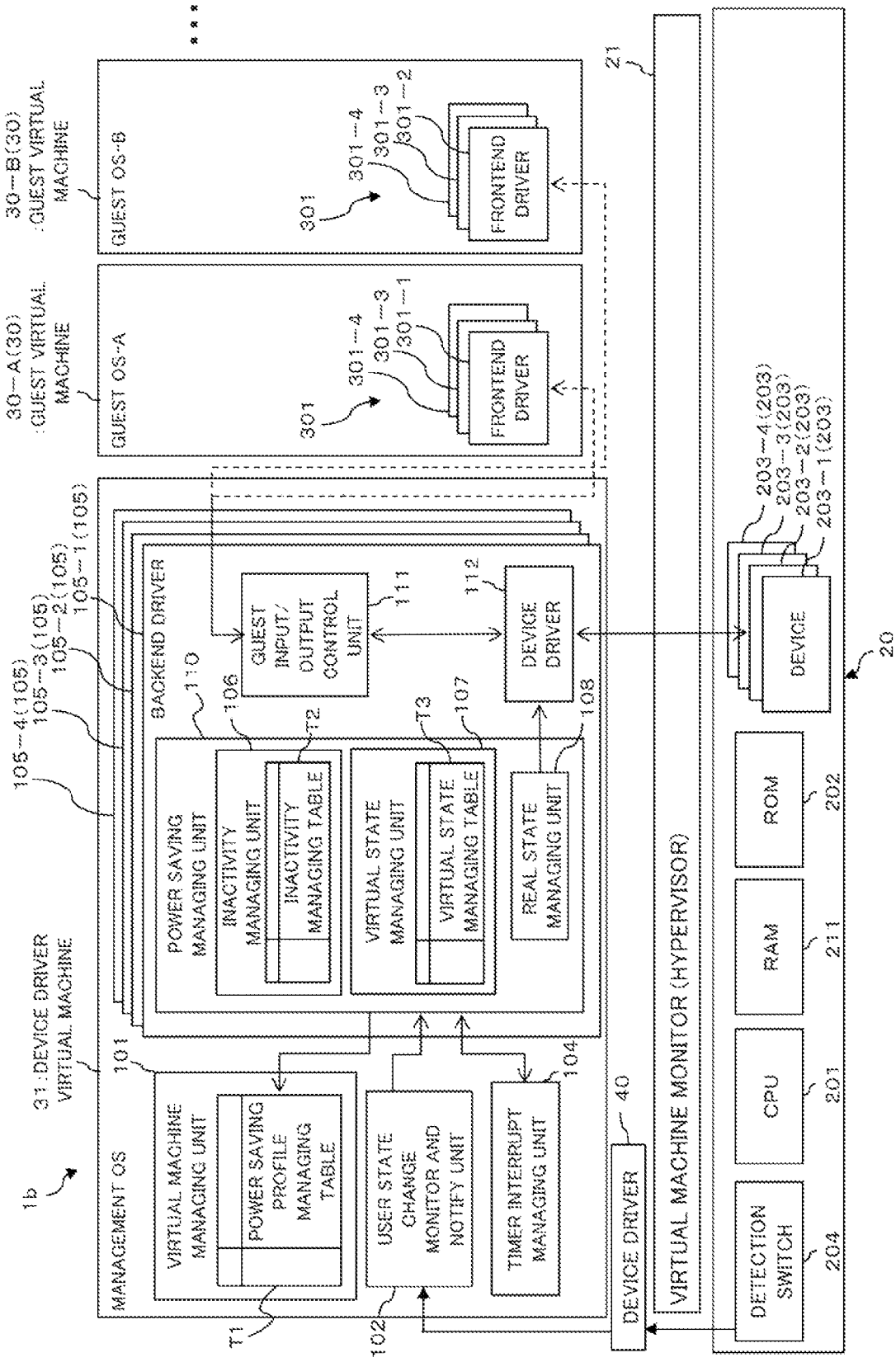
FIG. 8 is a pattern view illustrating a functional structure of an information processor as an example of a second embodiment.

FIG. 8 is a pattern view illustrating a functional structure of an information processor 1b as an example of a second embodiment.

The information processor 1b according to the second embodiment is an information processor such as a cellular phone, a PDA, and a personal computer as well as the information processor 1a according to the first embodiment. According to the present second embodiment, an example to use a cellular phone terminal as the information processor 1b will be also described. Hereinafter, the information processor 1b may be simply referred to as a terminal.

In the drawings, the identical remarks to the already-described remarks represent the identical or approximately-identical parts, so that explanations thereof are herein omitted.

The information processor 1b according to the second embodiment is provided with a detection switch 204 and a device driver 40 in the hardware resource 20 of the information processor 1a according to the first embodiment. Further, the device driver virtual machine 31 is provided with a user state change monitor and notify unit 102. Other parts are configured as well as those of the information processor 1a according to the first embodiment.

The detection switch (the detection unit) 204 is a switch that detects the usage state of the present information processor 1b and outputs the usage state as a detection signal ON or OFF. For example, in the case that the present information processor 1b is a flip cellular phone having a display unit and a keyboard unit that are openable and closable via a hinge, it is possible to use an opening and closing detection switch for detecting its open state and close state. In other words, detecting a change in an open state and a close state of the information processor 1b, the detection switch 204 notifies the user state change monitor and notify unit 102 of this detection result.

Hereinafter, in the present information processor 1b, a state that the display unit and the keyboard unit are open via the hinge (an open state) maybe referred to as terminal-open and a state that the display unit and the keyboard unit are closed via the hinge (a close state) may be referred to as terminal-closed.

Further, this detection switch 204 is not limited to the opening and closing detection switch but various modifications thereof can be realized. For example, the detection switch 204 may be a backlight detection switch for detecting lighting and extinction states of a backlight of a display of the present information processor 1b. In other words, the detection switch may detect that the backlight of the display is lighted when the information processor 1b is used and the backlight of the display is turned off when the information processor 1b is not used.

Then, detection signals to be outputted from this detection switch 204 are to be inputted into the user state change monitor and notify unit 102 of the device driver virtual machine 31 to be described later via the device driver 40.

The user state change monitor and notify unit 102 monitors a change in the user state and notifies the power saving managing unit 110 of the change. Then, the user state change monitor and notify unit 102 allows the Virtual State managing unit 107 to recalculate the Virtual State managing table T3 or allows the Real State managing unit 108 to reset the rear device state.

Specifically, when a change in the open state and the close state of the information processor 1b is notified from the detection switch 204 via the device driver 40, for example, the user state change monitor and notify unit 102 notifies the power saving managing unit 110 of this.

In addition, in the information processor 1b as an example of the second embodiment, the virtual machine managing unit 101 has a power saving profiled set at each state, namely, the open state and the close state of the information processor 1b in the power saving profile managing table T1.

Figure 9:
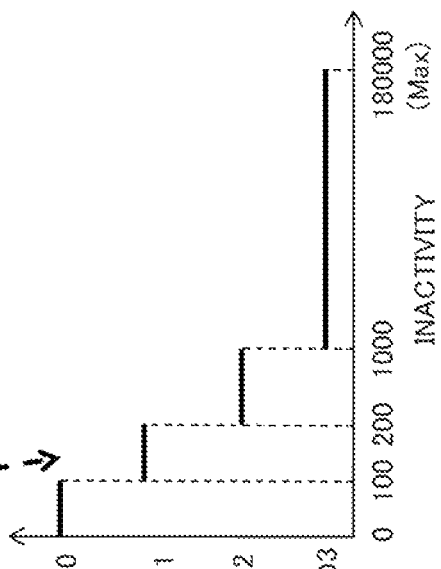
FIGS. 9A, 9B, and 9C are views for explaining a power saving profile managing table of the information processor as an example of the second embodiment.

FIGS. 9A, 9B, and 9C are views for explaining the power saving profile managing table T1 of the information processor 1b as an example of the second embodiment. Here, FIG. 9A illustrates the power saving profile managing table T1, and FIG. 9B illustrates a relation between respective power saving states and inactivity values of the camera device 203-3 corresponding to the guest OS-A. Further, FIG. 9C illustrates a relation between respective power saving states and inactivity values of the camera device 203-3 corresponding to the guest OS-B.

In the power saving profile managing table T1 illustrated in FIG. 9A, with respect to the camera device 203-3, two pieces of information about the terminal-open state and the terminal-close state (the user states) are registered.

With respect to the camera device 203-3, the case that the power saving profile is capable of being set in each case of the terminal-open state and the terminal-close state will be considered. For example, it is assumed that, in the case that the terminal is open, the camera device 203-3 can be operated by a screen of the terminal and an operation button inside of the terminal, and in the case that terminal is closed, the limited operation can be carried out by a small screen outside of the terminal and the operation button.

Here, it is assumed that the guest OS-A has the operation in the case that the terminal of the camera device 203-3 is open only mounted and in the case that the terminal of the camera device 203-3 is closed, there is no operation for operating the camera device. In such a case, as illustrated in FIGS. 9A and 9B, when the terminal is closed, the device state maybe always shifted to the power saving state D3.

In other words, the information processor 1b as an example of the second embodiment is capable of detecting a change of the user state so as to change the power saving profile.

Further, it is assumed that the quest OS-B has operation means of the camera device 203-3 mounted even in the state of the terminal-open and the state of the terminal-close. Therefore, as illustrated in FIG. 9A, it is assumed that the quest OS-B has the identical power saving profiles irrespective of the open state or the close state of the terminal.

Here, the case that respective inactivity values of the guest OS-A and the guest OS-B are more than 100 (namely, there are no input and output fore more than 10 seconds) with respective to the camera device 203-3 will be considered.

The Real State managing unit 108 has the power saving state D2 set as a real power saving state of the camera device 203-3 after comparing a provisional power saving state D2 of the guest OS-A with the power saving state D3 of the guest OS-B. Here, when the terminal is closed from this state, the state of the terminal-close is detected by means of the detection switch 204, and then, the user state change monitor and notify unit 102 is notified via the device driver 40.

Then, the user state change monitor and notify unit 102 notifies the power saving managing unit 110 of the state of the terminal-close, and then, the Virtual State managing unit 107 changes the provisional power saving state of the guest OS-A into D3. The Real State managing unit 108 compares this power saving state D3 with the power saving state D3 of the guest OS-B and as a result, D3 is to be reset as a real power saving state of the camera device 203-3.

In addition, the user state change monitor and notify unit 102 recognizes the Backend driver 105 that is influenced by a change of the terminal state in advance. For example, to a change in the states of the terminal-close and the terminal-open by means of the detection switch 204, the Backend driver 105-3 with respect to the camera device 203-3 is equivalent. In addition, plural Backend drivers 105 to be influenced are managed by a list having these Backend drivers 105 registered, for example.

Figure 10:
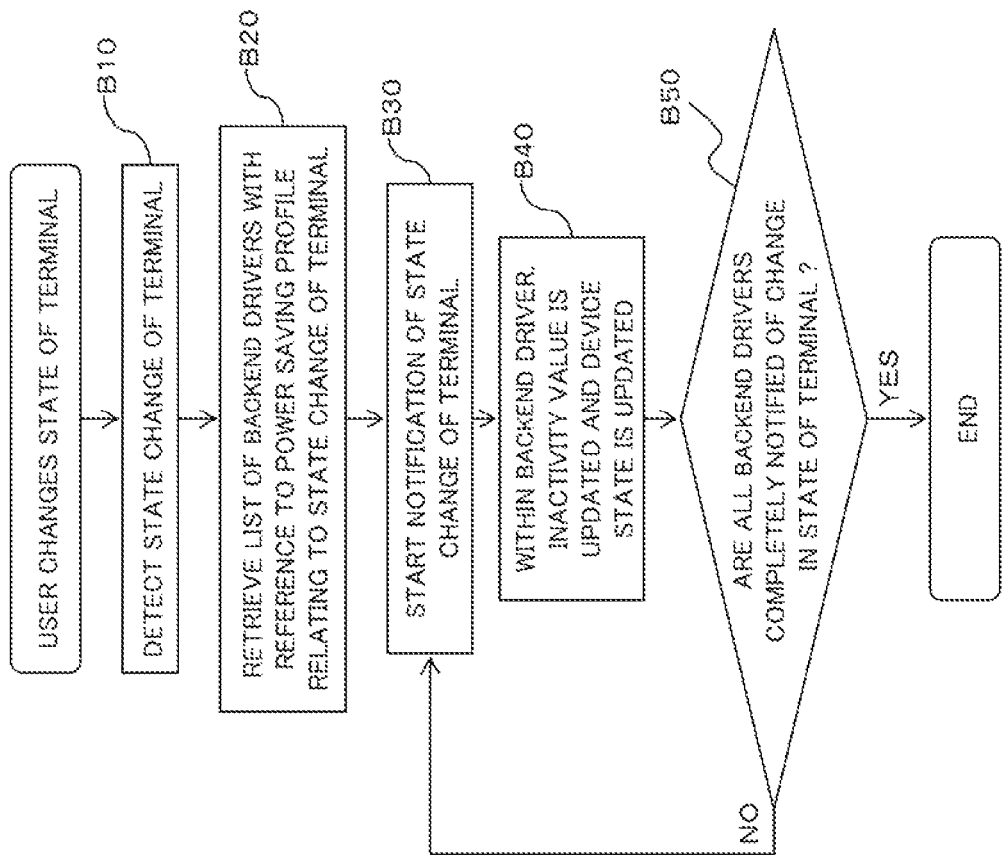
FIG. 10 is a flowchart for explaining the transition processing of recalculation and resetting of a power saving state in association with a change of a terminal state in the information processor as an example of the second embodiment.

The transition processing of recalculation and resetting of the power saving state in association with a change of the terminal state in the information processor 1b as an example of the second embodiment that is configured as described above will be described in accordance with the flowchart (steps B10 to B50) illustrated in FIG. 10.

When a user operates the information processor 1b to change the terminal state, the detection switch 204 detects a change in the state (step B10), and the user state change monitor and notify unit 102 is notified of this change via the device driver 40.

The user state change monitor and notify unit 102 retrieves a list of the Backend drivers 105 referring to the power saving profile managing table T1 with respect to this change in the terminal state (step B20). Then, the user state change monitor and notify unit 102 starts to notify the power saving managing unit 110 of the Backend drivers 105 registered in the list of a change in the terminal state (step B30).

In the Backend drivers 105 notified of a change in the terminal state, the inactivity values and the states of the devices are updated by means of the power saving managing unit 110 (the Inactivity managing unit 106) (step B40).

After that, it is checked whether or not the all Backend drivers 105 registered in the list are notified of a change in the state (step B50). After checking, in the case that the all Backend drivers 105 are not notified (refer to NO route of step B50), the processing will return to step B30.

In addition, in the case that the all Backend drivers 105 are notified of a change in the state (refer to YES route of step B50), the processing will end.

Thus, according to the information processor 1b as an example of the second embodiment, it is possible to the same operational effect as that of the above-described first embodiment and further, it is possible to carry out power saving control in accordance with a change in the terminal state by registering the power saving profiles in response to a change in the terminal state in the power saving profile managing table T1 in advance.

Further, according to the present second embodiment, an example that a change in the state of the terminal-open and the terminal-close as a change in the terminal state is detected by the detection switch 204 has been described, however, the present second embodiment is not limited to this. For example, it may be detected as a change in the state that a specific function mounted in the information processor 1b is used. Additionally, monitoring a remaining amount of a battery (not illustrated), the case that this remaining amount of the buttery is not less than a predetermined value may be detected as a change in the state. In addition, these detections of a change in the state may be carried out by using any of the hardware means or the software means. In other words, a change in the state may be detected from a notification from other device drivers, and a change in the state may be notified from any guest OS. Thus, various modifications can be available for detection of a change in the state.

For example, in a device such as a notebook PC and a cellular phone to be directly operated by the user, a policy of a power saving should be changed in response to the usage state of the terminal, for example, the usage state such that the user closes the terminal and does not operate the device or the usage state such that the device is connected to an AC adaptor or is not connected thereto.

According to the present information processor 1b, in accordance with the usage state of the user, plural power saving profiles of respective devices 203 can be set, and switching plural profiles in response to the notification of a change in the usage state, it becomes possible to reset the power saving modes.

In addition, for example, in the guest virtual machine 30, the policy of the power saving may be changed in response to the usage state whether or not a specific application runs.

According to the present information processor 1b, in the guest virtual machine 30, detecting the information whether of not a specific application is running and notifying switching of the power saving profile of the device driver virtual machine 31 from the corresponding guest virtual machine 30, it is possible to switch the power saving profiles and reset the power saving modes.

(C) Third Embodiment

Figure 11:
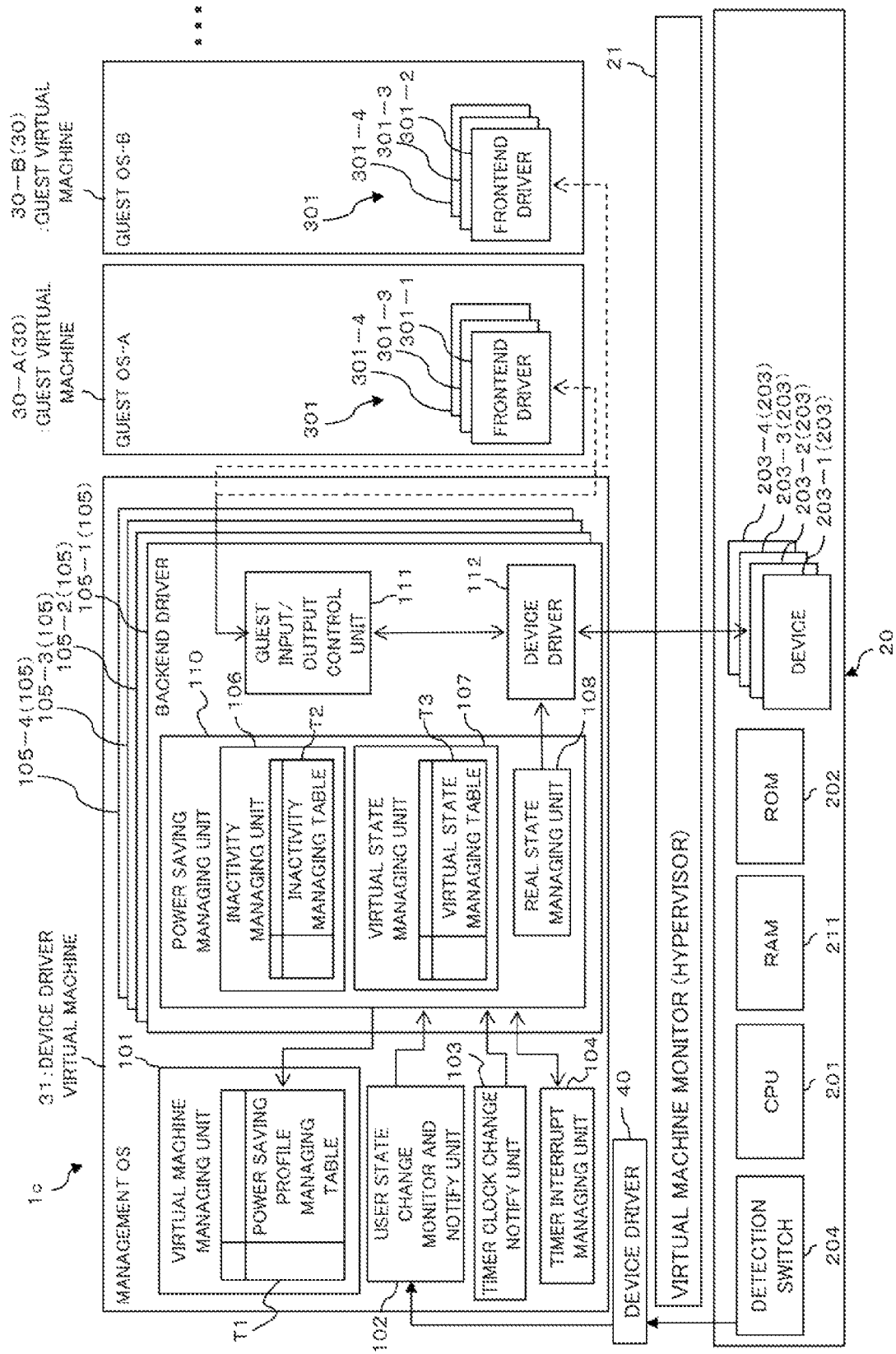
FIG. 11 is a pattern view illustrating a functional structure of an information processor as an example of a third embodiment.

FIG. 11 is a pattern view illustrating a functional structure of the information processor 1c as an example of a third embodiment.

The information processor 1c according to the present third embodiment is an information processor such as a cellular phone, a PDA, and a personal computer as well as the information processor 1a according to the first embodiment. According to the present third embodiment, an example of using a cellular phone terminal as the information processor 1c will be also described. Hereinafter, the information processor 1c may be simply referred to as a terminal.

In addition, in the drawings, the identical remarks to the already-described remarks represent the identical or approximately-identical parts, so that explanations thereof are herein omitted.

For example, a cellular telephone terminal periodically performs communication between the terminal and a base station in order to detect whether or not the terminal is in a service area of the base station or in order to check with or without incoming of a telephone call, an E-mail, and a short messaging service (SMS) or the like when the cellular telephone terminal detects that this terminal is in a service area.

Then, time intervals of communication between this terminal and the base station can be changed depending on the case that the user is using the terminal and the terminal is capable of communicating with the base station and the case that the user does not use the terminal, for example.

Further, as the case that the user is using the terminal, for example, the case that the user is during the call and the case that the user is using a network service such as Internet may be considered. In addition, as the case that the user is not using the terminal, for example, the case that the terminal is closed may be considered.

A periodical communication between this terminal and the base station is generally woken by the timer interrupt processing to be called at regular intervals by means of the timer interrupt managing unit 104 as well as the calculation of the inactivity values.

Then, according to the present third embodiment, in response to a change of a timer interrupt clock by means of the timer interrupt managing unit 104, a method of incrementing a time having no access to the devices 203 is changed.

In the information processor 1c according to the third embodiment, the device driver virtual machine 31 of the information processor 1b according to the second embodiment is provided with a timer clock change notify unit 103 and other parts are configured approximately-same as the information processor 1b according to the first embodiment.

In the information processor 1c according to the third embodiment, the timer interrupt managing unit (clock changing unit) 104 is provided with a function for changing a timer clock (reference timer clock) interval, namely, a clock changing function. For example, in the case that it is judged that the user does not use the terminal, this clock changing function elongates the above-described timer calling interval and extends a time interval for waking the processing as a power saving clock mode.

For example, in the case that the timer calling interval is 10 ms at a normal clock (a normal clock mode), the timer calling interval is changed to 2 s at a power saving clock (a power saving clock mode).

Thus, in the case that it is judged that the user does not use the terminal, the normal clock mode is shifted to the power saving clock mode so as to extend the timer calling interval and elongate the time interval for waking the processing. This leads to extension of idle time of a CPU, for example, and power saving can be realized more effectively.

Further, this function to change the reference timer clock interval may be realized by the Backend driver 105 for setting the timer clock function in place of the timer interrupt managing unit 104, and various modifications can be effected. In addition, the above-described modification processing of the timer clock will be carried out due to an instruction of the management OS.

Further, detection of the usage state of the user's terminal and the processing for changing the timer clock are carried out by the management OS itself with the instruction thereof or the Backend driver 105 for setting the timer clock mechanism. In other words, the management OS or the Backend driver 105 behaves as a clock changing unit for changing the reference timer clock interval of the information processor.

The timer clock change notify unit 103 detects that the timer clock is changed by the timer interrupt managing unit 104 to notify the power saving managing unit 110 of the Backend drivers 105 of this. In other words, this timer clock change notify unit 103 behaves as a clock change detection unit for detecting that the reference timer clock interval is changed.

In the case that the management OS changes the timer clock, the timer clock change notify unit 103 notifies respective Backend drivers 105 having the power saving managing unit 110 of a change of the timer clock at timing that is waken from this timer interrupt processing.

For example, it is possible to realize this notification method by providing a clock flag representing the clock state as a flag that can be referred from the power saving managing unit 110 of the respective Backend drivers 105 and rewriting this flag content by means of the timer clock change notify unit 103.

The clock flag includes 0: at a normal clock (an interval of 10 ms) and 1: at a power saving clock (an interval of 2 s), for example.

According to the information processor 1c of the third embodiment, the device driver virtual machine 31 is capable of changing a calculation method for incrementing a time that there is no access from respective guest virtual machines 30 to the devices 203 in accordance with the clock changed by the timer interrupt managing unit 104.

Specifically, the Inactivity managing unit 106 of the power saving managing unit 110 is provided with a function for changing the measurement method of the inactivity values. In other words, the Inactivity managing unit 106 behaves as a measurement method changing unit for changing the measurement method of the inactivity values. Then, when the timer clock change notify unit 103 detects a change of the reference timer clock interval, the Inactivity managing unit 106 changes the measurement method of the inactivity values.

When the timer clock mode is shifted to the power saving clock mode and the timer clock change notify unit 103 notifies the Inactivity managing unit 106 of a change of the timer clock interval, the Inactivity managing unit 106 changes a value to be incremented in one calculation of the inactivity value. Specifically, in the case that the timer clock interval is changed into X times as long as that of the normal clock, the Inactivity managing unit 106 changes a value to be incremented upon increment of the inactivity value X times.

For example, in the case that the timer clock interval is incremented by 1 at the timer clock interval of 10 ms (at the normal clock), if the timer clock interval is changed into 2 s (at the power saving clock), the Inactivity managing unit 106 changes the measurement method so as to increment the inactivity value by 200 at one calling.

In other words, the Inactivity managing unit 106 changes a quantity to be incremented (a increment quantity) upon increment of the inactivity values in response to the timer clock intervals in order to exclude an effect due to shifting to the power saving clock mode with respect to selection or setting of the real device state by means of the power saving managing unit 110.

For example, this increment quantity of the inactivity value is stored (set) in a predetermined area of the shared memory between the virtual machines, and the Inactivity managing unit 106 increments the inactivity value with reference to this increment quantity.

According to a flowchart (steps C10 to C220) illustrated in FIG. 12, a power managing method requiring the processing for changing a timer clock in the information processor 1c as an example of the third embodiment that is configured as described above will be explained.

Further, it is assumed that the guest virtual machines 30 and the device driver virtual machine 31 have been run in advance by means of the virtual machine monitor 21 (guest virtual machine realizing step, device driver virtual machine realizing step).

For example, in the case that it is detected that the user does not use the present information processor 1c depending on detection of the terminal close-state (detecting step), interrupt signals are inputted by control of the unused timer interrupt managing unit 104 and the management OS starts the processing for changing the timer clock (step C10). At first, the management OS obtains a list of the Backend drivers 105 having the power saving managing unit 110 (step C20). It is possible to obtain the list of the Backend drivers 105, for example, by outputting a demand signal from the management OS to respective Backend drivers 105 and sending a specific response signal to this demand signal only from the Backend drivers 105 having the power saving managing unit 110. Further, the management OS obtains the list of the guest OS connected to respective Backend drivers 105 (step C30). It is possible to obtain the list of the guest OS connected to the Backend drivers 105, for example, by means of the guest input/output control unit 111.

In the management OS, the timer clock change notify unit 103 changes respective clock flags corresponding to the obtained Backend drivers 105 (step C40).

After that, the power saving managing unit 110 starts to update the inactivity values of respective Backend drivers 105 (step C50).

In the Backend drivers 105, the power saving managing unit 110 obtains the list of the guest OS connected to the Backend drivers 105 (step C60). It is possible to obtain the list of the guest OS connected to the Backend drivers 105, for example, by the guest input/output control unit 111.

At first, in the list of the guest OS that is obtained, the first guest OS is selected (step C70). The power saving managing unit 110 starts to update a table (the inactivity managing table T2 and the Virtual State managing table T3) with respect to this selected guest OS (step C80).

The Inactivity managing unit 106 checks whether or not input and output are made between the guest OS and the devices 203 from the previous table update to this table update (step C90). In the case that no input and output are made between the guest OS and the devices 203 (refer to a NO route of step C90), next, the Inactivity managing unit 106 checks whether or not the inactivity value for the corresponding guest OS in the Inactivity managing table T2 becomes the upper limit (180000) (step C100). In the case that the inactivity value does not reach the upper limit (refer to No route of step C100), the Inactivity managing unit 106 increments the inactivity value by the increment quantity that has been set in advance, for example, in the shared memory between the machines (step C110).

Next, the Virtual State managing unit 107 obtains the power saving state corresponding to the current inactivity value with reference to the power saving profile managing table T1 on the basis of the inactivity value that is obtained in the step A60. The Virtual State managing unit 107 registers this obtained power saving state as a provisional device state in the virtual state managing table T3 relating to the target guest OS. Thereby, the virtual state managing table T3 is updated (step C120).

On the other hand, in the case that input and output are made between the guest OS and the devices 203 from the previous table update to this table update (refer to YES route of step C90), the Inactivity managing unit 106 changes the inactivity value into 0 (step C150) and shifts to step C120.

In addition, in the case that the inactivity values reach the upper limits (refer to YES route of step C100), the processing also shifts to step C120.

The power saving managing unit 110 checks whether or not the table is completely updated with respect to the target guest OS (step C130), in the case that update of the table is not completed, the processing returns to step C80.

Figure 12:
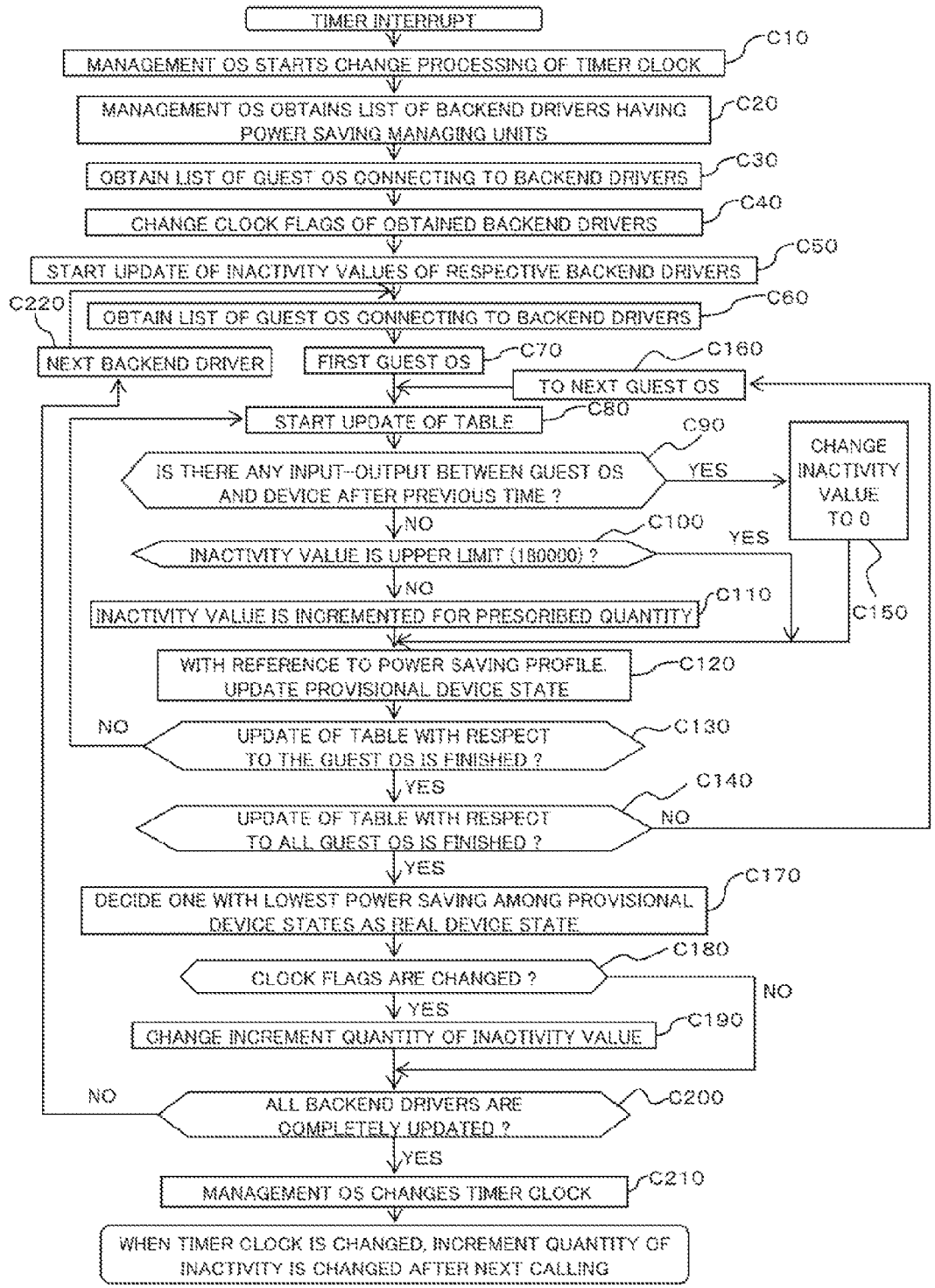
FIG. 12 is a flowchart for explaining a power managing method requiring the processing for changing a timer clock in the information processor as an example of the third embodiment.

Further, according to the example illustrated in FIG. 12, in these steps C80 to C130, the inactivity values are obtained. In other words, steps C80 to C130 are equivalent to a measuring step for measuring the elapsed time at the non-access state between the guest virtual machines 30 and the devices 203 as the non-access time.

In the case that the update of the table is completed with respect to the target guest OS (refer to YES route of step C130), next, the power saving managing unit 110 checks whether or not the update of the table is completed with respect to the all guest OSs in the list obtained in step C60 (step C140).

Here, in the case that update of the table is not completed with respect to the all guest OSs (refer to NO route of step C140), the power saving managing unit 110 returns to step C80 after changing a next guest OS in the guest OS list as a new target guest OS (step C160).

In the case that update of the table is not completed with respect to the all guest OSs (refer to YES route of step C140), the Real State managing unit 108 decides the provisional device state with the lowest level of power saving as a real device state from among the provisional device states relating to respective guest OS that are registered in the virtual state managing table T3 (step C170).

When the real device state is decided in this way, the Real State managing unit 108 sets the real device state that is decided with respect to the devices 203 via the device driver 112.

After updating of the inactivity values and the power saving states as described above, the power saving managing unit 110 checks whether or not the clock flags of the timer are changed (step C180: clock change detecting step). Then, in the case that the clock flags are changed (refer to YES route of step C180), the power saving managing unit 110 changes the increment quantities of the inactive values that are set in the shared memory between the machines, for example (step C190: measurement method changing step).

Then, the management OS checks whether or not the inactivity values are completely updated with respect to the all Backend drivers 105 (step C200). In the case that the inactivity values are completely updated with respect to the all Backend drivers 105 (refer to YES route of step C200), the management OS changes the timer clock (step C210: clock changing step) to end the processing.

In the case that the timer clock is changed, the increment quantity of the inactivity values is changed after the next calling.

According to the information processor 1c as an example of the third embodiment, it is possible to obtain the same operational effect as that of the above-described second embodiment.

Further, in the case that the clock flags are changed, the increment quantities of the inactive values are changed. Thereby, after the next calling of the processing update, by using the reset increment quantity, the inactivity values are updated.

Then, in response to the changed clock, it is possible to change the calculation method when incrementing the time without access from each guest virtual machine 30 to the corresponding device 203.

In addition, change of allocation of the CPU 201 to the virtual machines 30 in the virtual machine system and counting of time are generally carried out at timing of timer interrupt that is periodically set in hardware. Then, the device such as a cellular phone highly demanding power saving may save power consumption of the CPU, for example, by extending a clock of the timer interrupt when the user does not operate the device with the terminal closed.

According to the present information processor 1c, the device driver virtual machine 31 is informed of a change of the timer interrupt clock in the virtual machine system. Then, it is possible for the device driver virtual machine 31 to change the calculation method when incrementing time without accessing with respect to the accesses from respective virtual machines 30 to the devices 203 in response to this changed clock.

(D) Others

According to respective embodiments that are described above, the CPU 201 of the information processors 1a, 1b, and 1c behave as the device driver virtual machine 31, the guest virtual machines 30, the virtual machine managing unit 101, the user state change monitor and notify unit 102, the timer clock change notify unit 103, the timer interrupt managing unit 104, the power saving managing unit 110 (the Inactivity managing unit 106, the Virtual State managing unit 107, and the Real State managing unit 108), the guest input/output control unit 111, and the device driver 112, which have been described above, by executing the control program.

Further, the programs (the control programs) for realizing functions as these device driver virtual machine 31, the guest virtual machines 30, the virtual machine managing unit 101, the user state change monitor and notify unit 102, the timer clock change notify unit 103, the timer interrupt managing unit 104, the power saving managing unit 110 (the Inactivity managing unit 106, the virtual state managing unit 107, and the Real State managing unit 108), the guest input/output control unit 111, and the device driver 112 are provided, for example, being recorded in a computer-readable recording medium such as a flexible disc, a CD (a CD-ROM, a CD-R, and a CD-RW, or the like), a DVD (a DVD-ROM, a DVD-RAM, a DVD-R, a DVD+R, a DVD-RW, a DVD+RW, an HD, and a DVD, or the like), a Blue-ray Disc, a magnetic disc, an optical disc, and a magnetic optical disc. Then, reading the programs from the recording medium, a computer transfers the programs to an internal storage device or an external storage device in order to use the programs. In addition, recording the programs in a storage device (a recording medium) such as the magnetic disc, the optical disc, and the magnetic optical disc, the programs may be provided to the computer from the storage device via a communication path.

When realizing the functions as the device driver virtual machine 31, the guest virtual machines 30, the virtual machine managing unit 101, the user state change monitor and notify unit 102, the timer clock change notify unit 103, the timer interrupt managing unit 104, the power saving managing unit 110 (the Inactivity managing unit 106, the Virtual State managing unit 107, and the Real State managing unit 108), the guest input/output control unit 111, and the device driver 112, the programs that are stored in the internal storage device (according to the above-described respective embodiments, the RAM 21 and the ROM 202) are executed by a micro processor of the computer (according to the above-described respective embodiments, the CPU 201). In this case, it may be possible to execute the programs recorded in the recording medium when they are read by the computer.

Further, according to the present embodiments, the computer is a concept including hardware and an operating system and means hardware being operated under control of the operating system. In addition, in the case that the operating system is not required and the hardware is operated only by an application program, this hardware itself is equivalent to the computer. The hardware is provided with at least a micro processor such as a CPU and means for reading the computer programs that are recorded in the recording medium, and according to the present embodiment, the information processors 1a, 1b, and 1c have the functions as the computer.

The disclosures of the technologies are not limited to the above-described embodiments, but various modifications thereof may be implemented without departing from the spirit and scope of the present embodiments.

For example, according to the above-described respective embodiments, the examples are described, which are provided with the 3G device 203-1, the wireless LAN device 203-2, the camera device 203-3, and the SD memory device 203-4 as the devices 203; however, the present invention is not limited to these examples. In other words, the present invention may be provided with the devices other than those above or at least some among these devices. It is possible to implement the devices that are appropriately changed.

In the same way, according to the above-described respective embodiments, the example having the CPU 201, the RAM 211, the ROM 202, and the detection switch 204 provided one by one is illustrated; however, the present invention is not limited to this. In other words, the present invention maybe provided with two or more of at least some among the CPU 201, the RAM 211, the ROM 202, and the detection switch 204. It is possible to implement the devices that are appropriately changed without departing from the spirit and scope of each embodiment.

In addition, according to the above-described second embodiment, as an example of a change in the usage state of the terminal, the open state and the close state of the terminal are illustrated; however, the present invention is not limited to this. For example, a remaining amount of a battery that is not more than a threshold and execution of a predetermine application or the like may be used as a change in the usage state, so that various modifications of a change in the usage state of the terminal may be available.

In addition, according to the above-described second embodiment, the shift of the camera device 203-3 into the power saving mode is illustrated as an example; however, the present invention is not limited to this and the shift of other devices than the camera device 203-3 into the power saving mode may be available.

Further, according to the above-described embodiments, an example is illustrated, in which the management OS is run by means of the device driver virtual machine 31 and the Backend drivers are incorporated in this management OS; however, the present invention is not limited to this and various modified examples can be carried out. For example, the virtual machine monitor 21 may be configured being integrated with the management OS, and each of the Backend drivers 105 in the management OS may be run on the independent device driver virtual machine.

In addition, it is possible for a person skilled in the art to carry out and manufacture the present embodiments depending on the above-described disclosures.

According to an embodiment, it is possible to carry out power saving control of the devices.

A10 examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer including devices, the computer comprising:
    a plurality of guest virtual machines that processes said devices;
    a device driver virtual machine that performs access processing to said devices on behalf of said plurality of guest virtual machines a measuring unit that measures elapsed time at a non-access state between one of said guest virtual machines and said devices as a non-access time with respect to each of said guest virtual machines accessing said devices via said device driver virtual machine;
    a storage unit that stores operation profile information that matches said non-access time with operation mode information representing a plurality of operation modes of each of said devices, said plurality of operation modes allowing said plurality of guest virtual machines perform the access processing to said plurality of devices through said device driver virtual machine;
    a decision unit that decides the operation mode with reference to said operation profile information on the basis of said measured non-access time; and
    a transition control unit that shifts said devices to said operation mode,
    wherein said device driver virtual machine calculates a power saving state that respective quest virtual machines can shift a device to using a power saving profile managing table; and
    said device driver virtual machine changes a calculation method for incrementing a time that there is no access from respective quest virtual machines to the devices in accordance with a clock changed by a timer interrupt managing unit.

2. The computer according to claim 1, wherein said decision unit selects the operation mode with the lowest level of power saving from among the operation modes for said respective guest virtual machines sharing said devices and decides this as the operation mode.

3. The computer according to claim 2, wherein said decision unit decides the operation modes that the respective guest virtual machines are capable of shifting to as provisional operation modes for said respective plural guest virtual machines sharing said devices, and decides the provisional operation mode with the lowest level of power saving among these provisional operation modes as a device selection mode; and
    said transition control unit shifts said devices to said decided device selection mode.

4. The computer according to claim 1, the computer further comprising:
    a detection unit that detects a change in state of said computer; wherein said storage unit includes said operation profile information in accordance with the state of said computer, and said decision unit decides said operation mode with reference to said operation profile information in accordance with the state of said computer when said detection unit detects change in state of said computer.

5. The computer according to claim 4, wherein said guest virtual machines include said detection units.

6. The computer according to claim 1, the computer further comprising:
    a clock changing unit that changes a reference timer clock interval of said computer;
    a clock change detection unit to detect that said reference timer clock interval is changed by said clock changing unit; and
    a measurement method changing unit that changes a measurement method of said non-access time employed by said measuring unit; wherein, when change of said reference timer clock interval is detected by said clock change detection unit, said measurement method changing unit changes the measurement method of said non-access time employed by said measuring unit.

7. A control method executed by a computer provided with devices, the method comprising:
    realizing a plurality of guest virtual machines that processes said devices;
    realizing a device driver virtual machine that performs access processing to said devices on behalf of said plurality of guest virtual machines;
    measuring elapsed time at a non-access state between one of said guest virtual machines and said devices as a non-access time with respect to each of said guest virtual machines accessing said devices via said device driver virtual machine;
    deciding the operation mode with reference to operation profile information that matches said non-access time with operation mode information representing a plurality of operation modes of each of said devices, said plurality of operation modes allowing said plurality of guest virtual machines perform the access processing to said plurality of devices through said device driver virtual machine, on the basis of said non-access time measured in said measuring step; and
    shifting said devices to said decided operation mode,
    wherein said device driver virtual machine calculates a power saving state that respective quest virtual machines can shift a device to using a power saving profile managing table; and
    said device driver virtual machine changes a calculation method for incrementing a time that there is no access from respective quest virtual machines to the devices in accordance with a clock changed by a timer interrupt managing unit.

8. The control method according to claim 7, wherein said deciding step selects the operation mode with the lowest level of power saving from among the operation modes for said respective guest virtual machines sharing said devices and decides this as the operation mode.

9. The control method according to claim 8, wherein said deciding step decides the operation modes that respective guest virtual machines are capable of shifting to as provisional operation modes for said respective plural guest virtual machines sharing said devices, and decides the provisional operation mode with the lowest level of power saving among these provisional operation modes as a device selection mode; and said shifting step shifts said devices to said decided device selection mode.

10. The control method according to claim 7, the method further comprising:
    detecting a change in state of said computer;

wherein said deciding step decides said operation mode with reference to said operation profile information in accordance with the state of said computer when said detecting step detects change in state of said computer.

11. The control method according to claim 7, the method further comprising:
changing a reference timer clock interval of said computer;
detecting that said reference timer clock interval is changed by said clock changing step; and
changing a measurement method of said non-access time employed by said measuring step; wherein, when change of said reference timer clock interval is detected by said clock change detecting step, said measurement method changing step changes the measurement method of said non-access time employed by said measuring step.

12. A computer-readable non-transitory medium recording a control program for allowing a computer including devices to perform a procedure, the procedure comprising:
realizing a plurality of guest virtual machines that processes said devices;
realizing a device driver virtual machine that performs access processing to said devices on behalf of said plurality of guest virtual machines;
measuring elapsed time at a non-access state between one of said guest virtual machines and said devices as a non-access time with respect to each of said guest virtual machines accessing said devices via said device driver virtual machine that performs access processing to said devices on behalf of said plurality of guest virtual machines that processes said devices;
deciding the operation mode with reference to operation profile information that matches said non-access time with operation mode information representing a plurality of operation modes of each of said devices, said plurality of operation modes allowing said plurality of guest virtual machines perform the access processing to said plurality of devices through said device driver virtual machine, on the basis of said measured non-access time; and
shifting said devices to said decided operation mode,
wherein said device driver virtual machine calculates a power saving state that respective quest virtual machines can shift a device to using a power saving profile managing table; and
said device driver virtual machine changes a calculation method for incrementing a time that there is no access from respective quest virtual machines to the devices in accordance with a clock changed by a timer interrupt managing unit.

13. The computer-readable non-transitory medium according to claim 12, wherein said deciding selects operation mode with the lowest level of power saving from among the operation modes for said respective guest virtual machines sharing said devices and decide this as the operation mode.

14. The computer-readable non-transitory medium according to claim 13, wherein said deciding decides the operation mode that respective guest virtual machines are capable of shifting to as a provisional operation mode respectively for each of said plural guest virtual machines sharing said devices, and decides the provisional operation mode with the lowest level of power saving among these provisional operation modes as a device selection mode, and said procedure further comprising:
shifting said devices to said decided device selection mode as said transition control unit.

15. The computer-readable non-transitory medium according to claim 12, wherein said procedure further comprising: detecting change in state of said computer; and said deciding decides said operation mode with reference to said operation profile information in accordance with the state of said computer when said detecting detects change in state of said computer.

16. The computer-readable non-transitory medium according to claim 12, wherein said procedure further comprising:
changing a reference timer clock interval of said computer;
detecting a change of said reference timer clock interval by said changing;
changing a measurement method of said non-access time employed by said measuring and:
changing the measurement method of said non-access time employed by said measuring, when change of said reference timer clock interval is detected.

* * * * *